US009056240B2

(12) United States Patent
Carrell

(10) Patent No.: US 9,056,240 B2
(45) Date of Patent: Jun. 16, 2015

(54) APPARATUS FOR SIMULATING MOTION IN A VIRTUAL ENVIRONMENT

(76) Inventor: Matthew Carrell, Roseville, CA (US)

( * ) Notice: Subject to any disclaimer, the term of this patent is extended or adjusted under 35 U.S.C. 154(b) by 307 days.

(21) Appl. No.: 13/417,153

(22) Filed: Mar. 9, 2012

(65) Prior Publication Data
US 2013/0237378 A1 Sep. 12, 2013

(51) Int. Cl.
A63B 21/00 (2006.01)
A63C 17/00 (2006.01)
G06F 3/01 (2006.01)
A63C 17/06 (2006.01)
A63C 17/14 (2006.01)

(52) U.S. Cl.
CPC ............... *A63C 17/00* (2013.01); *G06F 3/011* (2013.01); *A63C 17/061* (2013.01); *A63C 17/1436* (2013.01); *A63C 2203/18* (2013.01); *G06F 2203/012* (2013.01)

(58) Field of Classification Search
CPC ............... A63B 2022/0271; A63B 2220/833; G06F 2203/012; G06F 3/011
USPC .............................................. 482/1–9, 51–54
See application file for complete search history.

(56) References Cited

U.S. PATENT DOCUMENTS

| 6,398,695 | B2 * | 6/2002 | Miller ............................. 482/52 |
| 6,676,569 | B1 * | 1/2004 | Radow .............................. 482/4 |
| 6,743,154 | B2 * | 6/2004 | Epstein .......................... 482/54 |
| 7,171,331 | B2 * | 1/2007 | Vock et al. .................... 702/160 |
| 7,470,215 | B2 * | 12/2008 | Maimone et al. ............. 477/175 |
| 7,470,218 | B2 * | 12/2008 | Williams ........................ 482/51 |
| 7,608,015 | B2 * | 10/2009 | Radow .............................. 482/4 |
| 8,122,772 | B2 * | 2/2012 | Clausen et al. ................. 73/812 |
| 8,663,133 | B2 * | 3/2014 | Johnson et al. ................ 601/23 |
| 8,675,018 | B2 * | 3/2014 | Mishra et al. ................ 345/633 |
| 2007/0298935 | A1 * | 12/2007 | Badarneh et al. ............. 482/52 |
| 2009/0058855 | A1 * | 3/2009 | Mishra et al. ................ 345/427 |
| 2010/0113222 | A1 * | 5/2010 | Radow .............................. 482/5 |
| 2011/0184225 | A1 * | 7/2011 | Whitall et al. ................. 600/28 |
| 2012/0302408 | A1 * | 11/2012 | Burger ........................... 482/54 |
| 2014/0087922 | A1 * | 3/2014 | Bayerlein et al. ............. 482/54 |
| 2014/0123984 | A1 * | 5/2014 | Johnson et al. ............... 128/845 |

* cited by examiner

Primary Examiner — Stephen Crow
(74) Attorney, Agent, or Firm — Plager Schack LLP

(57) ABSTRACT

This is directed to systems, processes, machines, and other means that simulate motion in a virtual environment. The invention comprising a constraining element and footwear that allow the user freedom of movement while limiting one to a circumscribed area. As the user moves within the circumscribed area ones movements are continuously recreated in virtual space simulating similar movements through the virtual space which are then displayed for the user.

7 Claims, 9 Drawing Sheets

APPARATUS FOR SIMULATING MOTION IN A VIRTUAL ENVIRONMENT

FIELD OF THE INVENTION

The present invention relates to the simulation of movement in a virtual environment based on measuring actual movement in a constrained environment.

BACKGROUND OF THE INVENTION

Previous devices have either comprised of exercise equipment such as stationary bikes, treadmills, or seats that may be driven by motors to simulate in game movement, confined space that allows very limited walking or running simulation, or have a very unstable walking surface that could prove hazardous for an inexperienced user; such as the concave, low friction platform of Williams' U.S. Pat. No. 7,470,218, or the large spherical apparatus used in Latypov's U.S. Pat. No. 5,846,134. Virtual reality devices in particular are very disorienting for some users. The obvious difficulty here is that it is very easy for a person running on an unstable surface to fall or suffer injury.

BRIEF SUMMARY OF THE INVENTION

Methods, systems, and other means are provided for a device that simulates motion in a virtual environment. In accordance with some embodiments there are two critical elements this apparatus would need for allowing a free full range of motion while keeping the user within a circumscribed area: 1) A constraining structure and 2) footwear that enables movement and measurement of that movement. There are three exemplary embodiments that may act as a constraining structure: 1) a hubless wheel; 2) a semi-fixed suspended pole and 3) an anchored pole. There are two varieties of footwear that may work in this environment 1) shoes that have a friction reducing lower surface and 2) shoes that contain multi-directional wheels.

BRIEF DESCRIPTION OF THE SEVERAL VIEWS OF THE DRAWINGS

Figure 1:
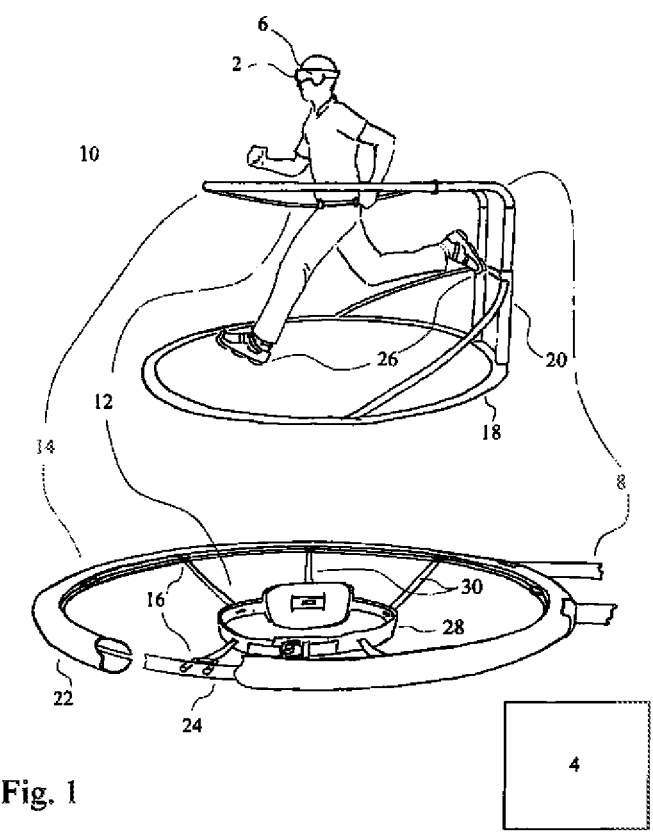

Having thus described the invention in general terms, reference will now be made to the accompanying drawings, which are not necessarily drawn to scale, and wherein:

FIG. 1 is a side view and perspective view of the first embodiment of the present invention.

Figure 1A:
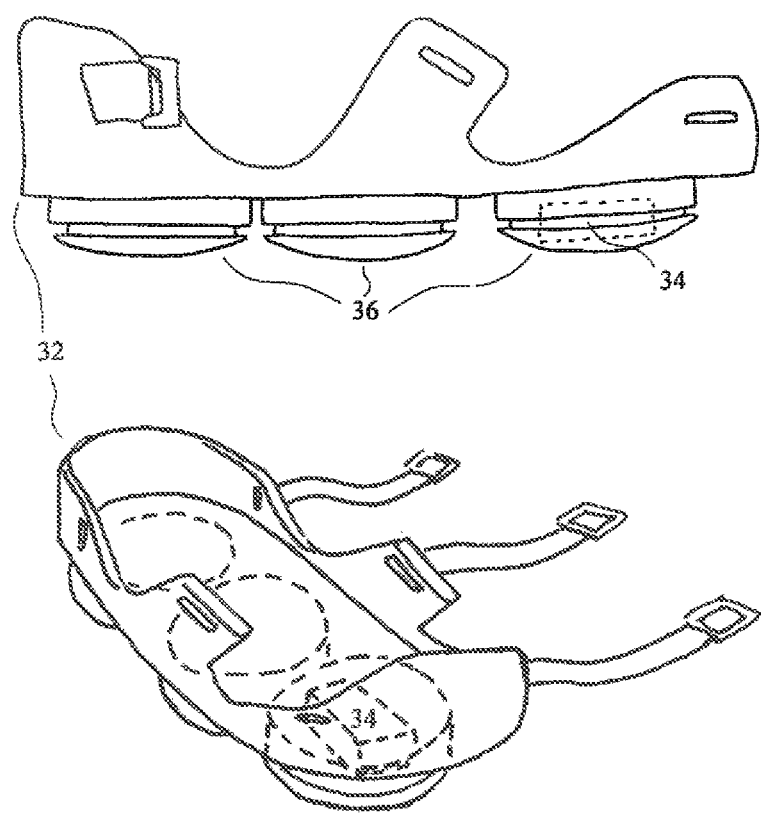

FIG. 1A is a side view and perspective view of the motion simulating footwear with a friction reducing lower surface.

Figure 1B:
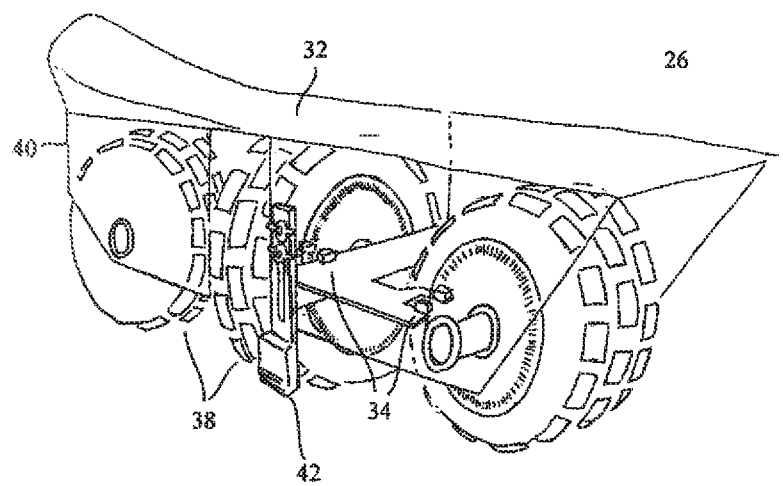

FIG. 1B is a perspective view of the motion simulating footwear with multi-directional wheels.

Figure 2:
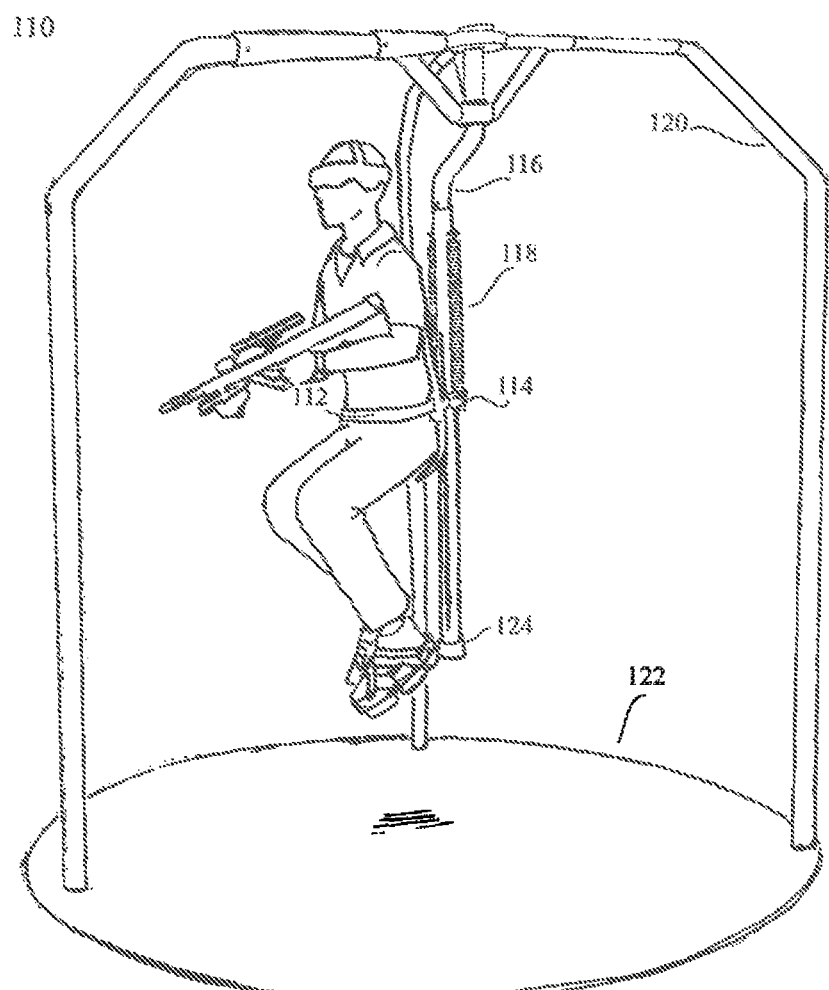

FIG. 2 is a side view of the second embodiment of the present invention.

Figure 2A:
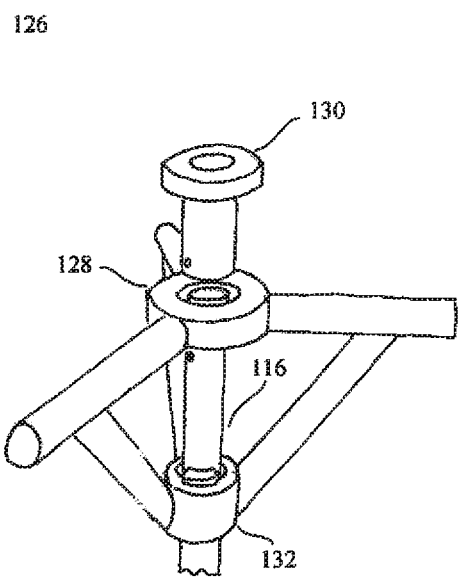

FIG. 2A is a perspective view of the top assembly.

Figure 2B:
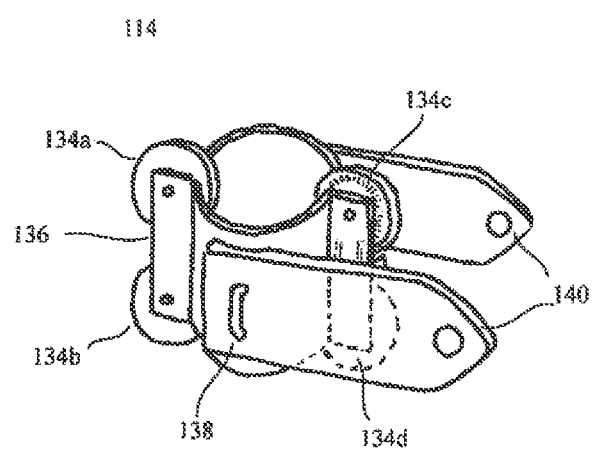

FIG. 2B shows the vertical movement mechanism.

Figure 2C:
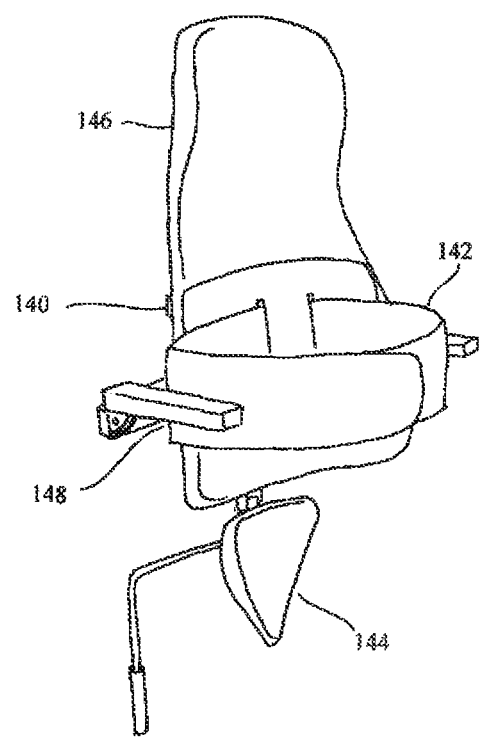

FIG. 2C shows the user support and belt system.

Figure 3:
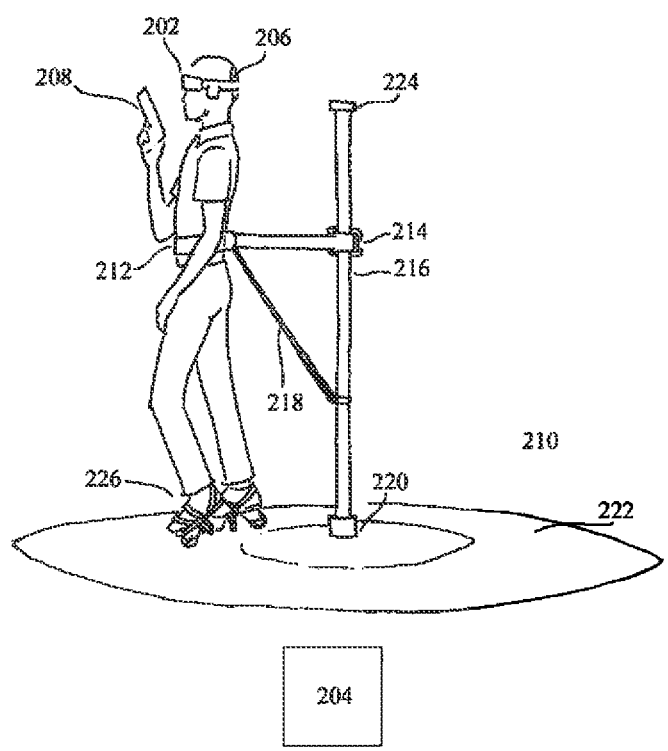

FIG. 3 is a side view of the third embodiment of the present invention.

Figure 4:
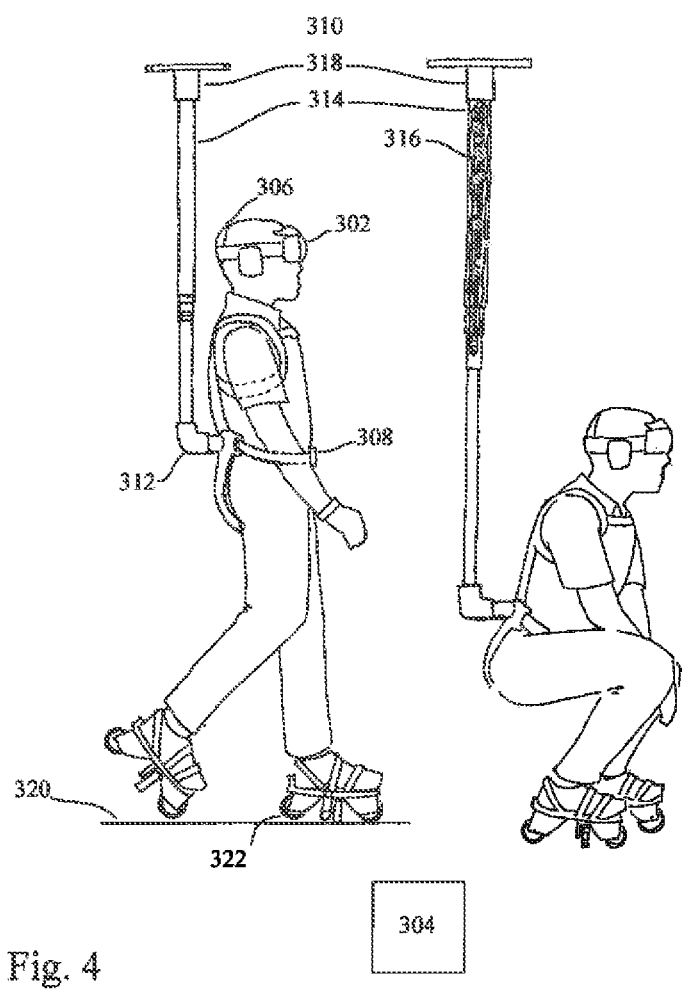

FIG. 4 is a side view of the fourth embodiment of the present invention.

DETAILED DESCRIPTION OF THE INVENTION

Embodiments of the present invention overcome many of the obstacles associated with moving in a full range of motion in a virtual environment, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows a first embodiment of the invention. CPU 4 is communicatively coupled to head mounted display 2 which gives the user the illusion of immersion in a virtual three-dimensional world. Head mounted display 2 comprises head tracking device 6 that may measure the head's yaw, pitch and roll and communicate the movements to CPU 4 to recreate said movements in the virtual environment allowing the user to naturally simulate observing their surroundings inside the virtual three-dimensional world. CPU 4 is a measurement system and, can be a computer, gaming system, or other device that uses the information to simulate a similar degree of movement in the virtual environment.

Constraining structure 10 comprises user support and belt system 12 mechanically coupled to hubless wheel 14. Hubless wheel 14 is mechanically coupled to user supporting arm 8. Preferably, hubless wheel 14 can travel vertically with user supporting arm 8 while allowing the innermost element of hubless wheel 14 to rotate. Hubless wheel 14 is mechanically coupled to user support and belt system 12 by a plurality of connecting devices 16 such that as the user rotates user support and belt system 12 it may also rotate hubless wheel 14.

The user may simulate walking while constrained in constraining structure 10 by using motion simulating footwear 26 which is communicatively coupled to CPU 4. Motion simulating footwear 26 allows users to move their legs in a full range of motion while communicating that movement to CPU 4 which then recreates that movement into similar movements in a virtual world. As used here, a full range of motion means the ability to pivot 360 degrees and perform jumping, squatting, walking, running, and strafing movements.

Here, constraining structure 10 allows a user to complete a full range of motion within a confined space. This full range of motion is possible in part because the user is constrained by user support and belt system 12 that support the user using one or more belts or constraints which are preferably adjustable to accommodate many different body styles. These belts or constraints may preferably constrain the user around the waist, hip, or groin in such a way to allow the user to bend, twist and run unimpeded by the geometrical restraints of constraining structure 10. User support and belt system 12 is mechanically coupled to hubless wheel 14 such that user support and belt system 12 can tilt and adjust to the user's position while keeping user support and belt system 12 aligned with hubless wheel 14. User supporting arm 8 may be mechanically coupled to fixed anchoring device 20 in such a way as to allow the user to jump and squat unimpeded.

Fixed anchoring device 20 mechanically couples constraining structure 10 to confined space which allows user supporting arm 8 to move vertically while restricting any lateral movement. Fixed anchoring device 20 should be mechanically coupled to base platform 18, but it may also be connected to any fixed surface such as the ground, a wall, a pole, doorway, ceiling, or ceiling support. The user may be constrained proximate the center of base platform 18 by user supporting arm 8, and anchoring device 20. The weight of the user on base platform 18 can also assist in anchoring constraining structure 10 in one location.

Hubless wheel 14 is comprised of a fixed outer race 22, and an ambulatory inner race 24. Ambulatory inner race 24 may be positioned within the inner perimeter of fixed outer race 22. Ambulatory inner race 24 can rotate freely within fixed outer race 22. Additionally, a bulwark may be mechanically connected to fixed outer race 22 and around the inner perimeter of ambulatory inner race 24 in a way that will not interfere with movement or the connection to the belt system 12 but will prevent warping, jamming, or other complications when the ambulatory inner race is stressed. To minimize friction and allow ambulatory inner race 24 to move easily within fixed outer race 22 there should be very little contact between the two. In other embodiments, pins, rollers, balls, bearings, or other methods may allow ambulatory inner race 24 to revolve freely while keeping it in position. Fixed outer race 22 is mechanically coupled to user supporting arm 8, which prohibits revolving and lateral movement. Connecting devices 16 are mechanically coupled to the inner perimeter of ambulatory inner race 24 at a series of attachment points. Hubless wheel 14 and user support and belt system 12 should have a large enough circumference to allow user's with extra-large waist sizes, 48 inches or more, to use it comfortably and may be adjustable to allow user's with very small waist sizes such as children to use it comfortably as well.

All of the parts used to construct constraining structure 10 should be modular to allow for easy disassembly and reassembly, and small enough to be able to carry through a standard size doorway. The parts constraining structure 10 comprises should be made of a material with the size and strength that may support many variations of user's weight, such as metal, hard plastic, carbon fiber, or wood. In some embodiments, the material will be hollow metal tubing, preferably steel or thick aluminum, that is light enough to transport cheaply, but strong enough to hold over 300 pounds.

In one embodiment, base platform 18 is a circular base made of some material that may reduce the amount of friction between motion simulating footwear 26 (described below) and a first surface of base platform 18. For example wood, hard plastic, carbon fiber, metal, tempered glass, or laminate flooring can be effective. Base platform 18 should be larger than the stride of a regular adult adding extra room to adjust for the displacement caused by the bend in user supporting arm 8. In one embodiment, a four to five foot diameter would be appropriate for a circular base platform 18. Base platform 18 may be many different shapes and sizes, such as being bowl shaped, being mechanized to move simulating small hills or inclines, or on an angle from the ground. In some embodiments, base platform 18 may be excluded from constraining structure 10 and walking simulation footwear 26 may contact the floor or ground directly.

Some embodiments of the present invention may measure turning, jumping and squatting by using an electronic measurement device within constraining structure 10 and communicatively couple them to CPU 4. Electronic measurement devices could be slotted disks that measures infrared light that passes through the slots as the disk is moved by the motion of the user in constraining structure 10. Another method could be a disk with white spots around the perimeter with one or more reflective photo detectors mounted in a way so as to measure the rate and direction the disk turns. A potentiometer connected to a gear may measure rotation as a cog within user supporting arm 8 rotates the potentiometer. These exemplary embodiments may be used with any of the movement detecting mechanisms used for the present invention. Other ways of measuring and converting the measurements into electronic signals which are well known may be used in other embodiments.

User support and belt system 12 may connect to the user in many ways. Preferably the user will wear adjustable belt 28 around the waist and affixed in a manner so that it will fit comfortably and not fall off. Other embodiments of user support and belt system 12 may be a plurality of straps, belts, ropes, harnesses, vests, wires, seats, supports or wearable outfits. Adjustable belt 28 is mechanically coupled to ambulatory inner race 24 with a plurality of user support connectors 30. User support connectors 30 may be straps, belts, elastic cords, rope, and other flexible connectors, or rigid connectors such as poles. In some embodiments, adjustable belt 28 may operate as hubless wheel 14 with the ambulatory inner race 24 being worn on the body as adjustable belt 28 and fixed outer race 22 being connected to user supporting arm 8 using user support connectors 30.

FIG. 1A shows motion simulating footwear 26 in detail from a side view. Motion simulating footwear 26 comprises a pair of devices further comprising a foot platform 32, friction reducing device 36, an electronic foot speed measurement device 34 such that the first device is a mirror image of the second device. Electronic foot speed measurement device 34 should be an accelerometer. Foot platform 32 may be any platform that will constrain the foot on the platform and maintain contact between the foot and platform while the user is running, walking, jumping, or strafing, such as a boot, shoe, sandal, strap, or sock. Foot platform 32 should be a flat platform with a plurality of straps that the user can connect normal footwear to foot platform 32 by employing the plurality of straps. The plurality of straps should be adjustable for different sizes of feet. Foot platform 32 should be manufactured in a way that allows the bottom-most surface to endure the intense forces that will be applied to it, such as hard plastic, polymers, carbon fiber, or metal.

Friction-reducing device 36 comprises a smooth friction-reducing bottom face that will allow friction-reducing device 36 to glide over many types of surfaces such as fabric, carpet, cloth, cardboard, padding, or many other possibilities. Friction-reducing device 36 comprises a bottom face that is fabric, carpet, cloth, cardboard, padding, or many other possibilities, that will allow friction-reducing device 36 to glide over many types of surfaces such as hardwood, concrete, linoleum, stone, or many other possibilities. Friction-reducing device 36 may be adjustable, detachable, replaceable, and come in many varieties and my comprise wheels, balls, rollers, or any other form of rolling or a sliding apparatus that will allow the footwear to move over flooring, carpet, ground, concrete, motion simulating footwear 26, or any other surface. Motion simulating footwear 26 can be used with friction-reducing platform 22.

In one embodiment electronic foot speed measurement device may be located within the friction-reducing device 36. Electronic foot speed measurement device 34 may comprise light emitting diodes and photo-diodes located as close to the base surface as possible to detect movement relative to the base surface through an opening or transparent material. Electronic foot speed measurement device 34 may use any other form of motion capture such as, accelerometers, gyroscopes, inertial, mechanical, and magnetic motion capturing systems. Electronic foot speed measurement device 34 is communicatively coupled to CPU 4. This communicative couple may be wireless, wired, or any other connection.

Some embodiments may measure the user's movements through sensors on the user's body. The sensors are mechanically coupled to the body of the user and may use infrared radiation to determine the movements of the user in a full range of motion. These sensors are communicatively coupled to a plurality of receivers which are further communicatively coupled to CPU 4. CPU 4 recreates that motion as explained above.

FIG. 1B shows wheeled footwear 26 which comprises foot platform 32, a plurality of omnidirectional wheels 38, wheel framework 40, bracing mechanism 42, and electronic foot speed measurement device 34. Wheel framework 40 is mechanically coupled to foot platform 32 or molded together with the foot platform 32 into a single manufactured article. Wheel framework 40 may be a continuous housing that holds omnidirectional wheels 38 inside of it, or it may be separate housings for each wheel. A plurality of axels is mechanically coupled to omnidirectional wheels 38 by a plurality of bearings and further coupled to wheel framework 40 such that a distance of at least a centimeter and less than an inch exists between foot platform 32 and wheel framework 40. Wheel framework 40 should be made of a material that can handle the forces from a full range of movement, such as metal, hard plastic, carbon fiber, or plastic polymer.

Omnidirectional wheels 38 comprise beaded wheels immediately adjacent to a hub. The beaded wheels further comprise beads that spin freely in the opposite direction of the beaded wheel's hub. These beaded wheels further comprise a plurality of small beads held in place with a plurality of connections that are immediately adjacent to the perimeter of the wheel axle such that the beads contact base platform 18 without having the connections contact base platform 18. These beaded wheels may be combined one or more to a hub in a manner that allows the beads from a first wheel to be touching the base platform 18 while a second wheel is positioned with the gap between beads suspended by the first wheel. Preferably the omnidirectional wheels 38 comprise two to four beaded wheels on a single hub that may be inserted onto an axle that is then fitted into the wheel framework 40. The omnidirectional wheels 38 may be positioned in various arrangements in very many wheel framework 40 carriage styles. Preferably one omnidirectional wheel 38 will be positioned under the approximate heel area of the foot platform 32, another proximate the middle of the foot platform 32 and another placed at approximate the toe of the foot platform 32. This positioning of the omnidirectional wheels 38 may help to make the user's footfall smooth and comfortable by distributing the points of contact between motion simulating footwear 26 and friction-reducing platform 22 over a greater area allowing the foot to roll from heel to toe somewhat naturally. The omnidirectional wheels 38 may be positioned under foot platform 32 along a slight arc, such as having omnidirectional wheels 38 at the heel and toe of foot platform 32 slightly higher than the middle wheel, allowing for more natural footfall. Omnidirectional wheels 38 may be positioned either under the foot platform 32 similar to a rollerblade, or on the sides of the foot platform 32 similar to a roller-skate.

Electronic foot speed measurement device 34 may be located between a first omnidirectional wheel running parallel to foot platform 32 and a second omnidirectional wheel running perpendicular to the same foot platform 32. The first omnidirectional wheel and the second omnidirectional wheel may be mechanically coupled to a slotted disk attached to the wheel's hub but extended out from the wheel about 1 to 3 cm. This arrangement may allow infrared LEDs to emit infrared radiation through the slots on the slotted disks to create a communicative couple with infrared LED sensors. When the user takes a step while wearing motion simulating footwear 26 omnidirectional wheels 38 turn with travel along base platform 18 further turning the slotted disk interrupting the radiation emitted from infrared LED and creating pulses of radiation communicated to the infrared LED sensors. Electronic foot speed measurement device 34 may use any other form of motion capture such as, accelerometers, gyroscopes, inertial, mechanical, and magnetic motion capturing systems. Electronic foot speed measurement device 34 is communicatively coupled to CPU 4. This communicative couple may be wireless, wired, or any other connection.

Bracing mechanism 42 allows the users to turn and pivot their bodies within constraining structure 10 by tilting the foot inwards at an angle to allow a pad mechanically coupled bracing mechanism 42 to create friction with the base platform 18. Bracing mechanism 42 is mechanically coupled to foot platform 32 and wheel framework 40 proximate the arch of the user's foot. Bracing mechanism 42 protrudes downward toward base platform 18. Bracing mechanism 42 should be manufactured to slide vertically to adjust and then lock tightly in place without slipping. The pad should be mechanically coupled to the bottommost surface and made of a material that creates high friction with a smooth surface without damaging it such as, rubber, plastic, or ceramic.

FIG. 2 shows a second embodiment of the invention. Constraining structure 110 comprises user support and belt system 112, where user support and belt system 112 is mechanically coupled to vertical movement mechanism 114. Vertical movement mechanism 114 is mechanically coupled to semi-fixed suspended pole 116 such that vertical movement mechanism 114 has the ambulatory freedom to slide vertically on semi-fixed suspended pole 116. Semi-fixed suspended pole 116 is semi-fixed because it is able to rotate, but not swing or move horizontally or vertically. Vertical movement mechanism 114 is mechanically coupled to elastic object 118. Elastic object 118 may be one or a plurality of springs or rubber bands that allow restricted movement to a point and then stop movement. Elastic object 118 is mechanically coupled to a first end of semi-fixed suspended pole 116 such that elastic object 118 supports some or all of the user's weight. Restricting cap 124 is mechanically coupled to a second end of semi-fixed suspended pole 116. Restricting cap 124 restricts vertical movement mechanism 114 from descending beyond the second end of semi-fixed suspended pole 116. Semi-fixed suspended pole 116 is mechanically coupled to stationary supporting pole system 120 such that supporting pole system 120 does not limit the rotation of semi-fixed suspended pole 116. Stationary supporting pole system 120 is mechanically coupled to friction reducing platform 122. In this embodiment, the user is constrained near the center of friction reducing platform 122 by constraining structure 110.

A track and wheel system comprises a plurality of wheels mechanically coupled to a wheel mechanism that encircles semi-fixed suspended pole 116 such that the plurality of wheels remain in contact with semi-fixed suspended pole by use of a track the semi-fixed suspended pole 116. The track and wheel system enables vertical movement mechanism 114 to glide on semi-fixed suspended pole 116 without the device jamming or catching.

In one embodiment, elastic object 118 will be a plurality of tension springs placed on opposite sides of semi-fixed suspended pole 116 where a first end of each of the tension springs is mechanically coupled to vertical movement mechanism 114 at points that would not interfere with the plurality of wheels or track. A second end of the plurality of tension springs is mechanically coupled to semi-fixed suspended pole 116 at locations that do not interfere with the plurality of wheels or track. This allows semi-fixed suspended pole 116 to bear the stress of vertical movement mechanism 114.

A first end of semi-fixed suspended pole 116 is mechanically coupled to a first end of restricting cap 124 which further comprises a lip of material larger than vertical movement mechanism 114 which limits vertical movement mechanism 114 descending below a first end of semi-fixed suspended pole 116. A second end of restricting cap 124 dampening material that dampens the contact between restricting cap 124 and vertical movement mechanism 114 should the user drop quickly.

Semi-fixed suspended pole 116 further comprises a bend above the connection to the elastic object 18 and below a first end of the top assembly shown in FIG. 2A below. User support and belt system 110 is mechanically coupled to the outermost face of semi-fixed suspended pole 116 so that when the user jumps parallel to semi-fixed suspended pole 116, the user may safely avoid a first end of the top assembly shown in FIG. 2A below. Semi-fixed suspended pole 116 can be adjusted by the user to the position they can most comfortably squat or to the preferred position the user may most comfortably run without the pole interfering with their gait by adding lengths of pole or through use of some telescoping device. Semi-fixed suspended pole 116 is mechanically coupled to stationary supporting pole system 120, which is further mechanically coupled to at the apex of constraining device 110. In some embodiments, semi-fixed suspended pole 116 is constrained from pendulous or vertical movement while allowing unconstrained pivoting.

Supporting pole system 120 comprises a plurality of supporting poles. In one embodiment supporting pole system 120 may have three to four supporting poles that may be adjusted by adding extra lengths of pole to supporting pole system 120 to allow a full range of motion in constraining structure 110. Supporting pole system 120 is mechanically coupled to friction reducing platform 122 which prevents shifting or moving of constraining structure 110 when force is exerted against semi-fixed suspended pole 116.

The user may simulate walking while constrained in constraining structure 110 by using a motion simulating footwear 126.

The poles used for supporting pole system 120, the top assembly FIG. 2A (described below), and semi-fixed suspended pole 116 should be made of a material with the size and strength that may support many variations of user's weight, such as metal, hard plastic, carbon fiber, or wood. In some embodiments, the material will be hollow metal tubing, preferably steel or thick aluminum, that is light enough to transport cheaply, but strong enough to hold over 300 pounds. In some embodiments, constraining structure 110 will not be taller than eight to ten feet, thus allowing it to fit within standard sized rooms in homes or offices.

Elastic object 118 should be made of a material with the size and strength that may support many variations of user's weight, such as elastic bands, elastic cords, extension springs, shock cord, surgical tubing, hydraulic device or silicone tubing. In some embodiments, elastic object 118 will be a tension spring made of steel that is long enough to allow vertical movement mechanism 114 to reach the restricting cap 124. A user should be able to jump without being hindered by Elastic object 18. When elastic object 118 is a tension spring, elastic object 118 should be covered will some material that will prevent the coils of the spring from pinching any part of the user such as clothing, hair, or skin.

FIG. 2A shows top assembly 126. Top assembly 126 comprises core interconnection 128, which is mechanically coupled to supporting pole system 120. Top assembly 126 may be located at the apex of constraining structure 110 and may mechanically couple semi-fixed suspended pole 116 to supporting pole system 120. Top assembly 126 further comprises pivoting connector cap 130, which is mechanically coupled to semi-fixed suspended pole 116 and held in place perhaps by a pin, bolt, threaded inserts, or heavy duty snap-fits. In some embodiments, semi-fixed suspended pole 116 is mechanically coupled to pivoting connector cap 130 by a bolt that is inserted at a point near or touching the bottom of the uppermost opening of pivoting connector cap 130 and protruding far enough to prevent any vertical movement transmitted to the semi-fixed suspended pole 116. Pivoting connector cap 130 is mechanically coupled to core interconnection 128 by inserting pivoting connector cap 130 through the uppermost opening of core interconnection 128 so that the wider lip rests on the upper surface of core interconnection 128 and the narrow portion passes through the bottom of the uppermost opening.

In another embodiment, semi-fixed suspended pole 116 is mechanically coupled to core interconnection 128 by auxiliary constraint 132 at a lower point so as to aid in stabilizing semi-fixed suspended pole 116. In some embodiments, top assembly 126 will have enough space between the top opening of core interconnection 128 and the bottom of auxiliary constraint 132 to sufficiently impede pendulous movement from semi-fixed suspended pole 116. This space can be six to fourteen inches, but preferably this will be ten to twelve inches to allow enough stabilization of semi-fixed suspended pole 116 without projecting low enough to be a hazard when the user is jumping.

Core interconnection 128 mechanically couples supporting pole system 120 in many ways. In one embodiment, supporting pole system 120 will extend downward from core interconnection 128 at an angle, which causes supporting pole system 120 to contact the edge of friction-reducing platform 122 with a downward bend towards the ground. This embodiment allows extra segments of pole to be added to stationary supporting pole system 120 allowing core interconnection 128 to be raised for taller users. In other embodiments, supporting pole system 120, core interconnection 128, and friction-reducing platform 122 can be joined into one piece.

FIG. 2B shows vertical movement mechanism 114 in more detail from a perspective view. Vertical movement mechanism 114 may employ any friction-reducing device that will allow vertical movement mechanism 114 to move vertically along the semi-fixed suspended pole 116. Preferably, this friction-reducing device will also prevent vertical movement mechanism 114 from rotating around semi-fixed suspended pole 116, thereby keeping vertical movement mechanism fixed on approximately one side of semi-fixed suspended pole 116 so the user's turning movements are transferred through the movement of semi-fixed suspended pole 116. In one embodiment vertical movement mechanism 114 would have a first wheel 134a, a second wheel 134b, a third wheel 134c, and a fourth wheel 134d mechanically coupled to axles which are further mechanically coupled to shuttle mechanism 136 that is immediately adjacent to semi-fixed suspended pole 116. Wheel 134a and wheel 134b are inserted into a first track running vertically along a first side of semi fixed suspended pole 116. Wheel 134c and wheel 134d are inserted into a second track running vertically along a second side of semi-fixed suspended pole 116 such that wheel 134a, wheel 134b, wheel 134c and wheel 134d are held in place by allowing coordination of the user's vertical movement without sticking, or jamming. Shuttle mechanism 136 is mechanically coupled to weight support connection 138, which is further mechanically coupled to elastic object 118. Weight support connection 138 is also mechanically coupled to user support connection 140, which is further mechanically coupled to user support and belt system 112. In some embodiments, weight support connection 138 will be on the side of shuttle mechanism 136 perpendicular to wheel 134a, wheel 134b, wheel 134c, wheel 134d thus keeping the elastic object 118 out of the path of the tracks and wheels. In some embodiments shuttle mechanism 136 comprises a friction reducing inner surface that enables shuttle mechanism 136 to slide easily around the outside of semi-fixed suspended pole 116. In some embodiments, shuttle mechanism 136 will be between two and eight inches in height, rest immediately adjacent to semi-fixed suspended pole 116, and be made of a material that is resistant to constant pressures from many directions such as metal, carbon fiber, or heavy-duty plastic. Weight support connection 138 should mechanically coupled to a first end of elastic object 118 to shuttle mechanism 136 and have a tensile strength of more than 300 pounds on weight support connection 138. This can be done with heavy-duty welds, or strong plastic molding. Weight support connection 138, user support connection 140 and shuttle mechanism 136 may be manufactured in a single unit to avoid weakness caused by fragile joints.

FIG. 2C shows user support and belt system 112 in detail from a perspective view. User support and belt system 112 comprises body constraining equipment 142 which can be a strap, belt, rope, harness, vest, wires, or wearable outfit that mechanically couples the user to vertical movement mechanism 114 (as shown in FIG. 2) and keeps the user at or proximate center of friction reducing platform 122 (as shown in FIG. 2). Body constraining equipment 142 comprises a waist constraint such as a belt or harness that may be adjustable to accommodate many different waist sizes. Body constraining equipment 142 further comprises upper body straps that may wrap around the torso, around the arms, shoulders, around the upper or lower chest or combinations of these. User support and belt system 112 may have connections on the back that extend toward vertical movement mechanism 114 which is mechanically coupled to user support connection 140 such that user support and belt system 112 can tilt up and down as the user moves while mechanically coupling user support and belt system 112 to vertical movement mechanism 114 (as shown in FIG. 2) such that the user's horizontal movements are transferred to semi-fixed suspended pole 116 (as shown in FIG. 2). User support and belt system 112 comprises back bulwark 146 that a user can comfortably press one's back against and separate one's clothing and body from vertical movement mechanism 114 (as shown in FIG. 2), elastic object 118 (as shown in FIG. 2), and semi-fixed suspended pole 116 (as shown in FIG. 2). User support and belt system 112 further comprises tailbone support device 144, such as a seat, that users can use to support their weight. Tailbone support device 144 may be adjustable for users of different body sizes, moveable to prevent it from obstructing the user's gait during running or walking, while being easily accessible for users to find even while they are immersed in the virtual environment and cannot visually search for user support and belt system 112. In some embodiments, tailbone support device 144 is mechanically coupled back bulwark 146 and hangs down to, or below, the user's tailbone. Tailbone support device 144 comprises a handle the user can utilize to swing tailbone support device 144 from seating position to a position allowing the user to run and walk. Tailbone support device 144 further comprises a locking mechanism that can hold tailbone support device 146 in an up or down position. The locking mechanism comprises pushing a pin or bolt into a opening that would allow tailbone support device 144 to support the user's weight without swinging back down into the position for running and walking. User support and belt system 112 further comprises arm support 148 that may also be adjustable to allow users of different body sizes to adjust them closer to, or farther from, the user's body. Arm support 148 is mechanically coupled to back bulwark 146 by a swinging connection or hinge that would allow arm support 148 an axial load as heavy as 300 pounds while remaining approximately parallel to the ground and may also be able to swing horizontally around the swinging connection's vertical axis.

Back bulwark 146, tailbone support device 144, and arm support 148 should be made of rigid material that can withstand the forces which the user will apply to them during movement, some examples of a rigid material may be hard plastic, carbon fiber, metal, wood, or plastic polymers. Tailbone support device 144, arm support 148 and back bulwark 146 should be cushioned, or padded to lessen the friction between the user and the rigid materials that make up the rest of user support and belt system 112. Back bulwark 146 will be wide enough to support the bone structure of an average adult's hips, about a 1 foot to 1½ feet wide, while having edges that taper back allowing for larger body sizes to comfortably be positioned against it as well. Body constraining equipment 142 is mechanically coupled to back bulwark 146 so body constraining equipment 142 can extend around the user's body. Back bulwark 146 may extend all the way up past the user's head or all the way down past the user's tailbone. Back bulwark 146 may include the tailbone support device 144, and arm support 148 in one single item of manufacture. Back bulwark 146 may connect to clothing the user is already wearing perhaps by using clasps that fix onto a belt or loop on the user's pants.

FIG. 3 shows a third embodiment of constraining structure 210 which utilized an anchored vertical pole instead of a hubless wheel. CPU 204 is communicatively coupled to head mounted display 202 which gives the user the illusion of immersion in a virtual three-dimensional world. Head mounted display 202 comprises head tracking device 206 that may measure the head's yaw, pitch and roll and communicate the movements to CPU 204 to recreate said movements in the virtual environment allowing the user to naturally simulate observing one's surroundings inside the virtual three-dimensional world. Controller 208 may be used to allow better interact with the virtual three-dimensional world and may contain the batteries, or other energy source for the wireless devices the present invention uses for communication.

Constraining structure 210 comprises user support and belt system 212 which is mechanically coupled to vertical movement mechanism 214. Vertical movement mechanism 214 is mechanically coupled to vertical pole 216 such that vertical movement mechanism 214 can slide vertically on vertical pole 216. Vertical movement mechanism 214 is mechanically coupled to telescoping support device 218 which is further mechanically coupled to user support and belt system 212 such that telescoping support device 218 supports some of the user's weight perhaps through the use of compression springs or hydraulics. The mechanical couple from telescoping support device 218 to vertical pole 216 can restrict vertical movement mechanism 214 from traveling below an adjustable point that would catch the user should one fall. Pivot connection 220 is mechanically coupled to the bottom of vertical pole 216 and allows the user to pivot on the vertical axis of vertical poles 216 while constraining one to a fixed location. Restricting cap 224 is mechanically coupled to the top of vertical pole 216, which restricts vertical movement mechanism 214 from ascending beyond the top of vertical pole 216. Pivot connection 220 and vertical pole 216 are mechanically coupled to friction reducing platform 222. The user may be constrained proximate the center of friction reducing platform 222 by constraining structure 210. The user may simulate walking while constrained in the area of constraining structure 210 by using walking simulating footwear 226 described in the first embodiment of the present invention.

FIG. 4 shows a fourth embodiment of constraining structure 310 with the same functionality as FIG. 1 above. CPU 304 is communicatively coupled to head mounted display 302, which gives the user the illusion of immersion in a virtual three-dimensional world. Head mounted display 302 comprises head tracking device 306 that may measure the head's yaw, pitch and roll and communicate the movements to CPU 304 to recreate said movements in the virtual environment allowing the user to naturally simulate observing their surroundings inside the virtual three-dimensional world.

Constraining structure 310 comprises user support and belt system 308 secured to connection joint 312. Connection joint 312 is mechanically coupled to telescoping suspended pole 314 such that a use can engage in a full range of motion around telescoping suspended pole 314. Connection joint 312 is mechanically coupled to elastic object 316 that may be located inside telescoping suspended pole 314 such that elastic object 316 would support some or all of the user's weight. Pivoting ceiling mount 318 is mechanically coupled to the top of telescoping suspended pole 314 such that pivoting ceiling mount 318 does not hinder the rotation of telescoping suspended pole 314. Constraining structure 310 should constrain the user proximate the center of friction reducing platform 320. The user may simulate walking while constrained in the area of constraining structure 310 by using walking simulating footwear 322.

The advantages of the present invention include, without limitation, that it is an excellent means of allowing users a free range of motion inside a virtual environment while being safer and more easy to use than any predecessors. The invention's simple electronic inputs have the capability to be used with currently available systems to allow the users to be immersed into their project, game, or program and move around naturally inside the virtual environment. Additionally, the present invention would be cheaper to produce due to a lack of complicated motors and electronics, and the use of simple devices to create the simulations that other devices require expensive high-tech apparatus and software to reproduce. The safety and ease of operation of the present invention may make it more appealing for everyday use, and may make it an excellent option for exercise programs, medical uses such as rehabilitation, training for military, commercial, and civilian sectors, entertainment, or even home uses.

That which is claimed:

1. An apparatus for simulating motion in a virtual environment, comprising:
    a constraining structure mechanically coupled to an adjustable user support system; wherein rotational movement of the human user is accommodated by rotation of the adjustable user support system within the constraining structure;
    a stationary friction reducing platform proximate the constraining structure;
    a foot platform configured to be worn on a foot of a human user; wherein the foot platform is configured to engage the stationary friction reducing platform to simulate motion;
    a motion simulating device, proximate a foot of the human user; wherein the motion simulating device is communicatively coupled to an electronic foot speed measurement device and an electronic measurement device; and
    a measurement system communicatively coupled to the electronic measurement device and the electronic foot speed measurement device;
    wherein the constraining structure is a hubless wheel further comprising a fixed outer race and an ambulatory inner race; wherein the ambulatory inner race rotates freely within the fixed outer race.

2. The apparatus of claim 1,
    wherein the constraining structure is mechanically coupled to a vertical pole;
    wherein the vertical pole is mechanically coupled to the stationary friction reducing platform.

3. The apparatus of claim 1,
    wherein the foot platform includes motion simulating footwear that further comprises a wheel framework mechanically coupled to a first omnidirectional wheel, a second omnidirectional wheel;
    wherein the electronic measurement device further comprises an infrared LED, and a slotted disk mechanically coupled to the wheel framework.

4. The apparatus of claim 1,
    wherein the motion simulating device further comprises the foot platform mechanically coupled to a friction reducing device; and
    wherein the electronic foot speed measurement device further comprises light emitting diodes and photo-diodes located inside the motion simulating device.

5. The apparatus of claim 1,
    wherein the motion simulating device further comprises a foot platform mechanically coupled to a friction reducing device; and
    wherein the electronic foot speed measurement device further comprises an accelerometer positioned proximate the foot of the human user.

6. The apparatus of claim 1, wherein the adjustable user support system further comprises a belt system, configured to wrap around a waist of a human user.

7. The apparatus of claim 6, further comprising connecting devices attached to the belt system and the ambulatory inner race; wherein the connecting devices enable movement of the belt system to move the ambulatory inner race without moving the fixed outer race.

* * * * *